Figure 1:
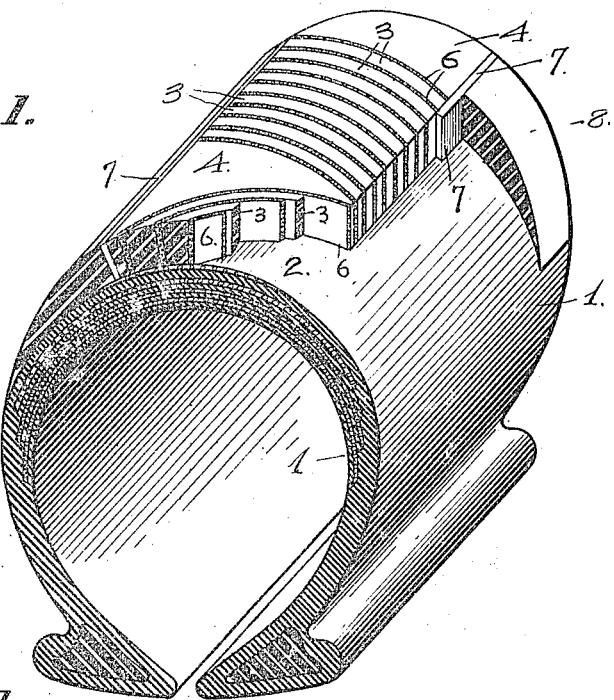

H. R. WATERMAN.
NON-SKID TIRE.
APPLICATION FILED JULY 23, 1917.

1,301,343.

Patented Apr. 22, 1919.

INVENTOR.
Herbert R Waterman.
BY
Arthur L. Slee
ATTORNEY.

UNITED STATES PATENT OFFICE.

HERBERT R. WATERMAN, OF SAN FRANCISCO, CALIFORNIA.

NON-SKID TIRE.

1,301,343.   Specification of Letters Patent.   Patented Apr. 22, 1919.

Application filed July 23, 1917. Serial No. 182,351.

*To all whom it may concern:*

Be it known that I, HERBERT R. WATERMAN, a citizen of the United States, residing in the city and county of San Francisco and State of California, have invented a new and useful Improvement in Non-Skid Tires, of which the following is a specification.

The present invention relates to improvements in non-skid tires wherein fabric strips are disposed perpendicularly to the tread and operate to prevent a longitudinal and lateral movement of the tire relatively to the pavement; and the objects of my invention are First, to provide an improved non-skid tire;

Second, to provide an improved non-skid tire adapted to retain its non-skidding propensities after considerable of the tread has been worn off;

Third, to provide an improved non-skid tire having substantially a plain surfaced tread without excessive shoulders to break down the carcass of the tire by reason of unequal pressure and vibration.

I accomplish these several objects by means of the device disclosed in the drawings forming a part of the present specification wherein like characters of reference are used to designate similar parts throughout the said specification and drawings, and in which—

Figure 2:
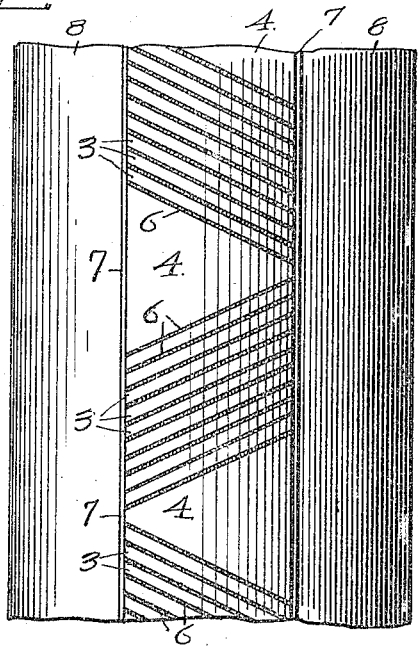

Figure 1 is a broken perspective view disclosing the construction of my improved non-skid tire; and Fig. 2 is a broken portion of a plan view of the tread.

Referring to the drawings the numeral 1 is used to designate a suitable casing around and upon the tread 2 of which are arranged in series vertically disposed diagonal rubber strips 3.

Triangular rubber layers or portions 4 are arranged at regular intervals between groups of the rubber strips 3 to alternate the direction of the groups of diagonal strips 3.

Between the rubber strips 3 and the triangular portions 4 and the strips 3 I have provided vertically disposed fabric strips 6 which are of substantially the same depth as the strips 3. These strips 6 are properly vulcanized to adjacent rubber strips 3 and to the sides of the triangular portions 4, the whole forming an integral circumferential strip of alternately diagonal rubber and fabric strips 3 and 6 respectively, which is in turn properly vulcanized to the tread 2 of the casing 1.

The fabric strips 6, owing to their nature, extend very slightly above the rubber strips 3 to effectively engage the pavement to prevent a longitudinal and lateral movement of the casing relatively to the pavement.

A thin circumferential strip 7 of superior rubber stock is arranged around the tread 2 and adjacent the ends of the strips 3 and 6 and the triangular portions 4. I have found from experiment that the superior stock more effectively secures the non-skid tread which may be of inferior stock and therefore I have employed the superior stock for the strips 7.

In order to avoid annular or circumferential shoulders, which experience has shown has a tendency to break down the carcass of the tire through unequal expansion, I have provided a chamfered strip 8, the thicker edge of which lies adjacent to the strip 7 with the thinner edge lying upon and secured to the sides of the tire or casing 1.

As the strips 3 and 6 are of considerable depth it is evident that the non-skidding propensities will still reside within the tread after a considerable portion of the non-skid means has become worn away.

It is also obvious that as there are no excessive projections or annular shoulders that the expansion of the tire under a working load will be substantially equal throughout the said tire with the result that the fabric carcass of the tire will not be exposed or subjected to undue or excessive expansion and tension. Consequently longer life is imparted to the carcass as well as to the non-skidding propensities of said tire.

Having thus described my invention what I claim as new and desire to secure by Letters Patent is—

1. A non-skid tire comprising a casing; alternately diagonal strips of rubber arranged around the tread of the casing; vertically disposed strips of fabric secured between the diagonal rubber strips to engage the pavement to prevent a longitudinal and lateral movement of the casing relatively to a pavement; and circumferential side strips extending from the ends of the diagonal rubber and fabric strips to the sides of the casing.

2. A non-skid tire comprising a casing; a series of diagonal rubber strips arranged around the tread of the casing; a series of triangular rubber portions arranged at regular intervals between groups of the rubber strips to alternate the direction of adjacent groups; vertically disposed fabric strips arranged between the diagonal strips and triangular portions to engage a pavement to prevent a longitudinal and lateral movement of the casing relatively to the pavement; a circumferentially arranged strip on each side of the diagonal rubber portions and fabric strips; and a chamfered side strip extending from each circumferentially arranged strip to the sides of the casing.

In witness whereof I hereunto set my signature.

HERBERT R. WATERMAN.